(12) United States Patent
Nilsson et al.

(10) Patent No.: US 11,057,066 B2
(45) Date of Patent: Jul. 6, 2021

(54) ALTERING FILTERING BY CHANGING MIXING FREQUENCY WHEN INTERFERER PRESENT

(71) Applicant: Telefonaktiebolaget LM Ericsson (publ), Stockholm (SE)

(72) Inventors: Magnus Nilsson, Lund (SE); Peter Jakobsson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/769,050

(22) PCT Filed: Dec. 22, 2017

(86) PCT No.: PCT/EP2017/084371
§ 371 (c)(1),
(2) Date: Jun. 2, 2020

(87) PCT Pub. No.: WO2019/120562
PCT Pub. Date: Jun. 27, 2019

(65) Prior Publication Data
US 2021/0175915 A1    Jun. 10, 2021

(51) Int. Cl.
*H04B 1/10* (2006.01)
(52) U.S. Cl.
CPC .................. *H04B 1/1036* (2013.01)
(58) Field of Classification Search
CPC .............. H04B 1/1036; H04B 1/10; H04B 2001/1054; H04B 1/1063
See application file for complete search history.

(56) References Cited

U.S. PATENT DOCUMENTS

| 6,977,978 | B1 | 12/2005 | Jakobsson | |
|---|---|---|---|---|
| 2002/0057751 | A1* | 5/2002 | Jagger | H04W 24/10 375/346 |

(Continued)

FOREIGN PATENT DOCUMENTS

| EP | 1379003 A2 | 1/2004 |
|---|---|---|
| EP | 2106029 A1 | 9/2009 |

(Continued)

OTHER PUBLICATIONS

3rd Generation Partnership Project, "3rd Generation Partnership Project; Technical Specification Group Radio Access Network; Evolved Universal Terrestrial Radio Access (E-UTRA); User Equipment (UE) Radio Transmission and Reception (Release 14)", Technical Specification, 3GPP TS 36.101 V14.5.0, Sep. 1, 2017, pp. 1-1509, 3GPP.

(Continued)

*Primary Examiner* — Lewis G West
(74) *Attorney, Agent, or Firm* — Coats & Bennett, PLLC

(57) ABSTRACT

A filtering arrangement for a wireless communication receiver is disclosed. The filtering arrangement comprises an input port configured to receive a digital signal, wherein the digital signal has a signal bandwidth and comprises a desired signal, dividing circuitry configured to divide the digital signal into two or more signal parts, wherein the two or more signal parts comprise two edge signal parts, and a respective processing branch associated with each of the two or more signal parts. A processing branch configured to process a respective edge signal part comprises a digital edge filter configured to filter the edge signal part, determination circuitry configured to determine whether an un-desired signal is comprised in the edge signal part, and frequency shifting circuitry configured to frequency shift the edge signal part responsive to determination by the determination circuitry.

(Continued)

Corresponding wireless communication receiver, filtering method and computer program product are also disclosed.

20 Claims, 4 Drawing Sheets

(56) References Cited

U.S. PATENT DOCUMENTS

| | | | |
|---|---|---|---|
| 2010/0285761 A1* | 11/2010 | Morris | H04B 1/28 455/113 |
| 2010/0297977 A1* | 11/2010 | Morris | H04B 1/109 455/307 |
| 2013/0315194 A1* | 11/2013 | Ahn | H04L 5/0066 370/329 |
| 2015/0222459 A1 | 8/2015 | Rafique et al. | |
| 2016/0127051 A1* | 5/2016 | Petrovic | H04B 1/1018 455/63.1 |
| 2016/0233869 A1* | 8/2016 | Khoury | H04J 3/06 |
| 2018/0070267 A1* | 3/2018 | Ye | H04W 16/00 |

FOREIGN PATENT DOCUMENTS

| | | |
|---|---|---|
| JP | H02213228 A | 8/1990 |
| WO | 2006055791 A1 | 5/2006 |
| WO | 2015010263 A1 | 1/2015 |
| WO | 2015100725 A1 | 7/2015 |

OTHER PUBLICATIONS

3rd Generation Partnership Project, "3rd Generation Partnership Project; Technical Specification Group Radio Access Network; E-UTRA, UTRA and GSM/EDGE; Multi-Standard Radio (MSR) Base Station (BS) Radio Transmission and Reception (Release 14)", Technical Specification, 3GPP TS 37.104 V14.5.0, Sep. 1, 2017, pp. 1-88, 3GPP.

* cited by examiner

ALTERING FILTERING BY CHANGING MIXING FREQUENCY WHEN INTERFERER PRESENT

TECHNICAL FIELD

The present disclosure relates generally to the field of signal processing. More particularly, it relates to filtering of received signals.

BACKGROUND

Generally, signal reception may comprise receiving a desired signal and one or more un-desired signals, and signal processing in a receiver may aim at removing the un-desired signal(s) without interfering with the desired signal. This task becomes increasingly cumbersome the closer an un-desired signal is to the desired signal in the frequency domain.

FIG. 1 schematically illustrates two signal spectra, that of a desired signal 100 and that of an un-desired signal 110, which is close to the desired signal. When a filter 120—designed to let the desired signal pass unaltered—is applied, the un-desired signal is not completely blocked out since it is close to the desired signal and the edge of the filter is not steep enough.

Example approaches to mitigating adjacent channel interference by adaptive filtering are described in U.S. Pat. No. 6,977,978 B1 and US 2015/0222459 A1.

In UMTS LTE (universal mobile telecommunication system long term evolution) the spectrum utilization is typically 90% while in 5G ($5^{th}$ generation communication systems), it is proposed to increase the spectral utilization to over 98%. This means that the guard band width between desired and un-desired signals will decrease (narrowed guard band) and un-desired signals (e.g. a blocking signal, a.k.a. a blocker) may be situated very close to the desired signal in some scenarios. A similar problem may arise when IoT (Internet of things) signaling is intertwined in systems such as UMTS LTE or GSM (global system for mobile communication) where existing guard bands between carriers are used for the IoT signaling.

A typical approach to un-desired signals close to the desired signal is application of filtering with very steep filter edges. Such a filter may, for example, be implemented as a FIR (finite impulse response) filter, wherein a steeper filter edge typically requires an increased number of filter taps. An increased number of filter taps may have several drawbacks, including increased hardware cost, increased latency, increased distortion (e.g. due to inter-symbol interference caused by the length of the impulse response of the filter), and other degradation impact.

Therefore, there is a need for alternative approaches to handling of un-desired signals close to a desired signal.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

It is an object of some embodiments to solve or mitigate, alleviate, or eliminate at least some of the above or other disadvantages.

According to a first aspect, this is achieved by a filtering arrangement for a wireless communication receiver. The filtering arrangement comprises an input port configured to receive a digital signal, wherein the digital signal has a signal bandwidth and comprises a desired signal, dividing circuitry configured to divide the digital signal into two or more signal parts (wherein the two or more signal parts comprise two edge signal parts), and a respective processing branch associated with each of the two or more signal parts.

A processing branch configured to process a respective edge signal part comprises a digital edge filter configured to filter the edge signal part, determination circuitry configured to determine whether an un-desired signal is comprised in the edge signal part, and frequency shifting circuitry configured to frequency shift the edge signal part responsive to determination by the determination circuitry.

In some embodiments, the frequency shifting circuitry is configured to frequency shift the edge signal part before filtering by the digital edge filter by a first amount in a first mode responsive to a determination that the un-desired signal is not comprised in the edge signal part, to provide a first overlap between the frequency shifted edge signal part and the filter frequency range, and a second amount in a second mode responsive to a determination that the un-desired signal is comprised in the edge signal part, to provide a second overlap between the frequency shifted edge signal part and the filter frequency range, wherein the second overlap is less than the first overlap.

In some embodiments, the frequency shifting circuitry is further configured to, in the second mode, frequency shift the edge signal part after filtering by the digital edge filter by a third amount, wherein the second amount plus the third amount equals the first amount.

In some embodiments, the filtering arrangement further comprises a fast Fourier transformer (FFT) configured to transform outputs of the processing branches into frequency domain, and index shifting circuitry configured to shift FFT bin indices in the second mode such that (for each of the edge signal parts) the output of the processing branch is frequency shifted by a third amount, wherein the second amount plus the third amount equals the first amount.

In some embodiments, the determination circuitry is configured to detect an input power level and an output power level of the digital edge filter and determine whether the un-desired signal is comprised in the edge signal part responsive to a difference between the input power level and the output power level.

In some embodiments, the determination circuitry is configured to detect an output power level of the digital edge filter and determine whether the un-desired signal is comprised in the edge signal part responsive to a difference between the output power level and an output power level of another corresponding digital edge filter of a corresponding processing branch of another filtering arrangement, wherein the filtering arrangement and the other filtering arrangement are operating in different ones of the first and second modes.

A second aspect is a wireless communication receiver comprising the arrangement of the first aspect.

A third aspect is a filtering method for a wireless communication receiver. The method comprises receiving a digital signal, wherein the digital signal has a signal bandwidth and comprises a desired signal, dividing the digital signal into two or more signal parts, wherein the two or more signal parts comprise two edge signal parts, and processing the two or more signal parts by a respective associated processing branch.

For each of the two edge signal parts, the processing comprises determining whether an un-desired signal is comprised in the edge signal part, frequency shifting the edge signal part responsive thereto, and filtering the frequency shifted edge signal part by a digital edge filter.

A fourth aspect is a computer program product comprising a non-transitory computer readable medium, having thereon a computer program comprising program instructions. The computer program is loadable into a data processing unit and configured to cause execution of the method according to the third aspect when the computer program is run by the data processing unit.

In some embodiments, any of the above aspects may additionally have features identical with or corresponding to any of the various features as explained above for any of the other aspects.

An advantage of some embodiments is that handling of un-desired signals close to a desired signal is enabled. Typically, such handling concerns alternative approaches to mitigating adjacent channel interference by adaptive filtering.

Another advantage of some embodiments is that the number of filter taps required may be kept at a relatively low number, which may have the further advantages of one or more of decreased hardware cost, decreased latency, and decreased distortion.

Yet an advantage of some embodiments is that existing hardware designs may be reused for implementation of the disclosed approaches.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where alternative approaches to handling of un-desired signals close to a desired signal are presented. An adaptive filter approach is applied to avoid having to use long filters, wherein edge part of the filter are adaptively adjusted in frequency as will be explained in the following.

Figure 1:
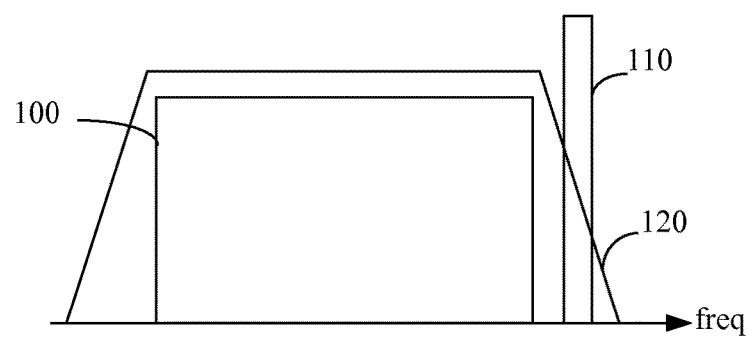
FIG. 1 is a schematic drawing illustrating two signal spectra and example filtering.
Figure 2:
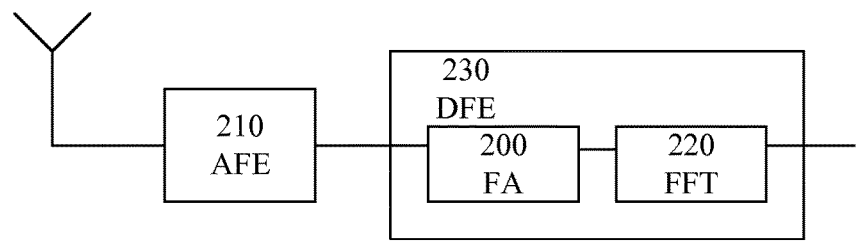
FIG. 2 is a schematic block diagram illustrating an example arrangement according to some embodiments.

FIG. 2 schematically illustrates an example arrangement for a wireless communication receiver according to some embodiments. The arrangement comprises an analog front end (AFE) 210, which may comprise any suitable processing such as, for example, antenna duplexers, low noise amplifiers, analog down-converters, analog filters and analog-to-digital converters. Although not shown in FIG. 2, the arrangement may be for an active antenna system (AAS) receiver, wherein use of a large number of antennas may be applicable. The arrangement also comprises a digital front end (DFE) 230, which may comprise a filtering arrangement (FA) 200 and a fast Fourier transformer (FFT) 220. Typically, embodiments discussed herein may be related to (e.g. be comprised in or performed by) the filtering arrangement 200.

Figure 3:
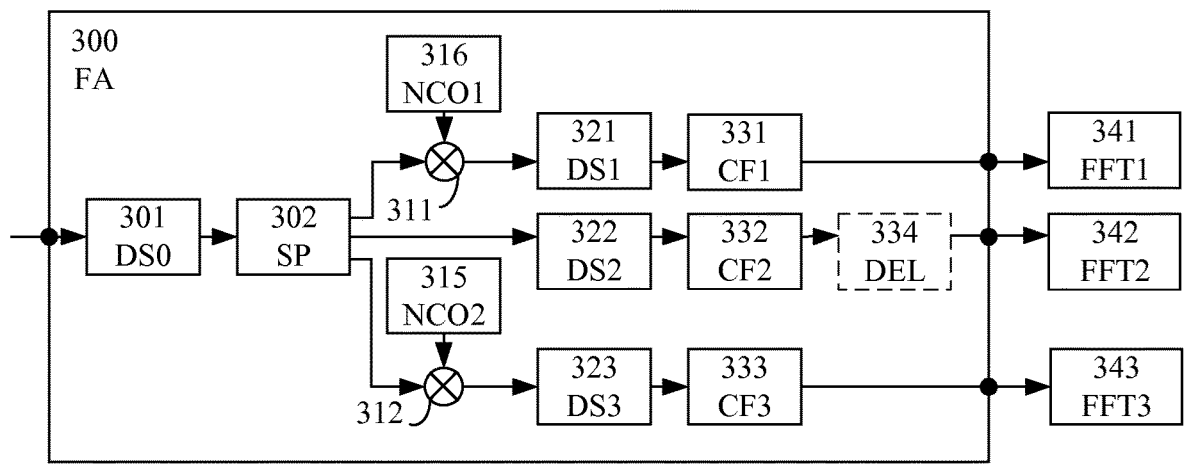
FIG. 3 is a schematic block diagram illustrating an example arrangement according to some embodiments.

FIG. 3 illustrates an example filtering arrangement (FA) 300 according to the prior art that may be comprised in the filtering arrangement 200 of FIG. 2. A received signal is input to the filtering arrangement after analog processing and analog-to-digital conversion. The received signal is down-sampled in an initial down-sampler (DS0) 301 and thereafter split into three copies by splitting circuitry (SP) 302, wherein each copy refers to a corresponding signal part in the frequency domain.

Dividing the signal into two or more signal parts as described herein has the advantage of reducing the size of FFT blocks (e.g. in an orthogonal frequency division multiplexing, OFDM, receiver). It also has the benefit of reducing the required filter length in each processing branch. Generally, the signal may be divided into two signal parts, three signal parts, four signal parts, or any number of signal parts larger than four. Three signal parts will be used herein as a non-limiting example.

The upper and lower processing branches of FIG. 3 comprises a respective numerically controlled oscillator (NCO1, NCO2) 316, 315 and corresponding mixer circuitry 311, 312 (e.g. complex multipliers configured to rotate the signal). These blocks may be referred to as frequency shifting circuitry and their purpose is to frequency shift the signal copy of the respective processing branch so that the corresponding signal part of the frequency domain matches a channel filter (typically, but not necessarily, a low pass filter) to be applied in the processing branch. In some implementations, all of the processing branches have frequency shifting circuitry and in other implementations, some (e.g. one) of the processing branches do not have any frequency shifting circuitry (as exemplified by the mid-branch in FIG. 3).

Each of the signal copies may be further down-sampled in respective down-samplers (DS1, DS2, DS3) 321, 322, 323 if applicable. Thereafter the signal copy of each of the processing branches is filtered in a respective channel filter (CF1, CF2, CF3) 331, 332, 333. Typically, but not necessarily, channel filters applied to the signal copies that are associated with edge signal parts (i.e. parts of the signal spectrum that reside in a frequency interval at an end of the signal spectrum) may be steeper (comprising more filter taps) than channel filters applied to the signal copies that are associated with interior signal parts (i.e. parts of the signal spectrum that reside in a frequency interval that is not at an end of the signal spectrum). If this is the case, processing of the interior signal part(s) may comprise delaying the output of the channel filter by a period of time corresponding to the difference in filter lengths as illustrated by delay circuitry (DEL) 334 in FIG. 3.

Conversion to frequency domain may be accomplished by applying a separate FFT FFT1, FFT2, FFT3) 341, 342, 343 to each of the processing branches.

Figure 4:
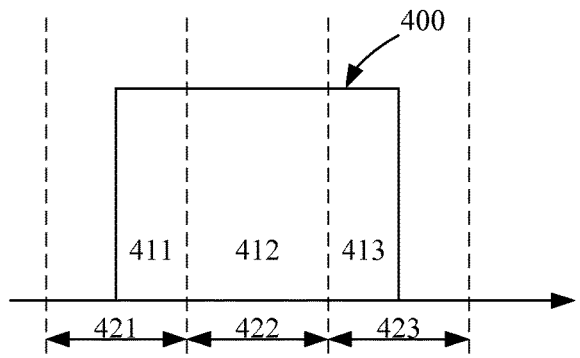
FIG. 4 is a schematic drawing illustrating a signal spectrum and example filtering according to some embodiments.
Figure 4:
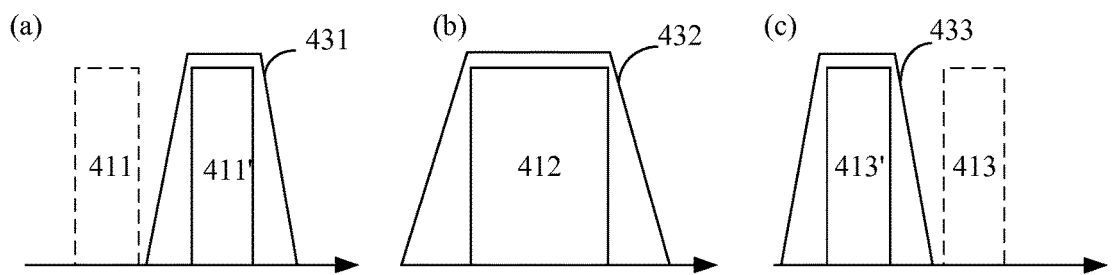

FIG. 4 schematically illustrates a signal spectrum and example filtering according to some embodiments. For example, FIG. 4 may be used as an illustration of the processing executed by the arrangement in FIG. 3.

The desired signal 400 is divided into three signal parts; two edge signal parts 411, 413 and one interior signal part 412. Typically, the division is accomplished by splitting/copying the signal 400 and frequency shifting it, such that the respective frequency interval 421, 422, 423 matches the channel filter to be applied. This is illustrated in the lower part of FIG. 4.

In part (a) the signal copy is frequency shifted (compare with 316 and 311 of FIG. 3) such that the edge signal part 411, illustrated after the frequency shift by 411', fits the channel filter 431 applied in the corresponding processing path (compare with 331 of FIG. 3). In part (b) the signal copy is not frequency shifted since this interior signal part 412 already fits the channel filter 432 applied in the corresponding processing path (compare with 332 of FIG. 3). In part (c) the signal copy is frequency shifted (compare with 315 and 312 of FIG. 3) such that the edge signal part 413, illustrated after the frequency shift by 413', fits the channel filter 433 applied in the corresponding processing path (compare with 333 of FIG. 3).

Figure 5:
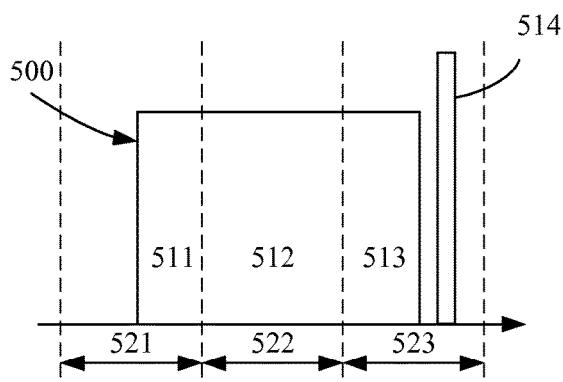
FIG. 5 is a schematic drawing illustrating two signal spectra and example filtering according to some embodiments.
Figure 5:
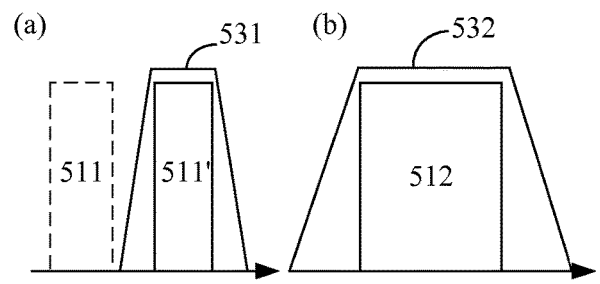
Figure 5:
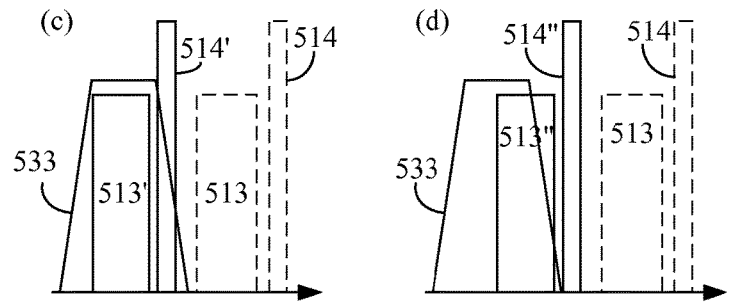

FIG. 5 schematically illustrates two signal spectra, that of a desired signal 500 and that of an un-desired signal 514, and example filtering according to some embodiments. For example, FIG. 5 may be used as an illustration of the processing executed by any of the arrangements as will be described later in connection with FIGS. 6 and 7.

As for FIG. 4, the desired signal 500 is divided into three signal parts; two edge signal parts 511, 513 and one interior signal part 512. The edge signal part 513 is very close to the undesired signal 514. The frequency shifting of the signal copies, such that the respective frequency interval 521, 522, 523 matches the channel filter to be applied, is illustrated by parts (a)-(d) of FIG. 5.

Parts (a) and (b) correspond to parts (a) and (b) of FIG. 4. Thus, in part (a) the signal copy is frequency shifted such that the edge signal part 511, illustrated after the frequency shift by 511', fits the channel filter 531 applied in the corresponding processing path, and in part (b) the signal copy is not frequency shifted since this interior signal part 512 already fits the channel filter 532 applied in the corresponding processing path.

In part (c) the signal copy is frequency shifted similarly to part (c) of FIG. 4, such that the edge signal part 513, illustrated after the frequency shift by 513', fits the channel filter 533 applied in the corresponding processing path. However, since the un-desired signal 514 will be frequency shifted by the same amount, illustrated after the frequency shift by 514', it will in this scenario also pass the channel filer 533 to a substantial degree. Part (d) illustrates an approach to avoid this problem without application of a steeper channel filter 533.

In part (d) the signal copy is frequency shifted by a smaller frequency shift than in part (c) such that the edge signal part 513, illustrated after the frequency shift by 513", does not perfectly fit the channel filter 533 applied in the corresponding processing path. However, the un-desired signal 514, illustrated after the frequency shift by 514", will in this scenario be blocked by the channel filer 533. The slight mismatch between the signal part 513" and the channel filter 533 may be mitigated by other processing (e.g. by application of a forward error correcting, FEC, code). Alternatively, the mismatch may be overlooked and any degradation simply accepted. In some scenarios, the signal part affected by the mismatch may already be adversely affected by adjacent channel leakage (e.g. defined via adjacent channel leakage ratio, ACLR) and/or folding phenomena (e.g. defined via adjacent channel selectivity, ACS) such that a further degradation due to filter mismatch is not very serious in terms of performance.

Parts (c) and (d) of FIG. 5 illustrates two different modes that may be applied for each of the edge signal parts depending on whether or not they experience an un-desired signal close by; part (c) being applied when there is no close un-desired signal and part (d) being applied when there is a close un-desired signal.

Figure 6:
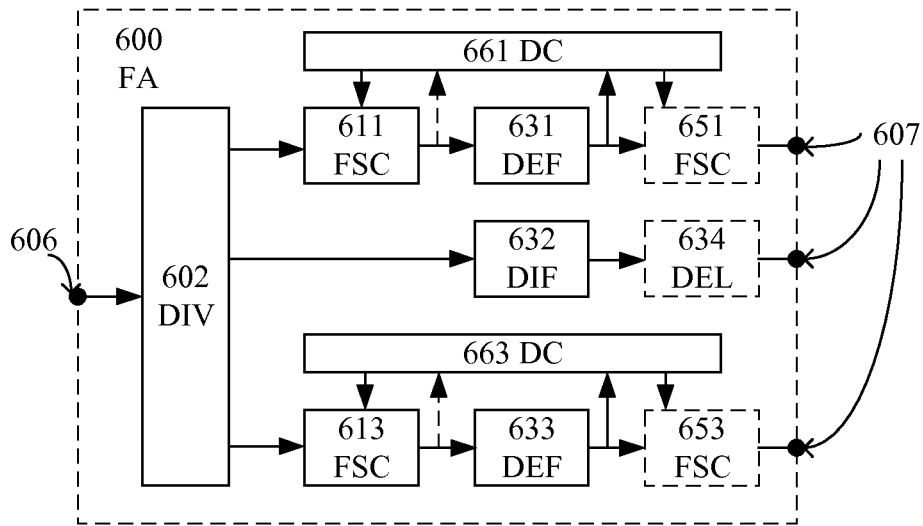
FIG. 6 is a schematic block diagram illustrating an example arrangement according to some embodiments.

FIG. 6 is a schematic block diagram illustrating an example filtering arrangement (FA) 600 according to some embodiments. The filter arrangement may, for example, be comprised in the filter arrangement 200 of FIG. 2 and/or may, for example, operate in accordance with the approach described in connection with FIG. 5. Typically, the filter arrangement may be for (e.g. may be comprised in) a wireless communication receiver.

The filter arrangement 600 comprises an input port 606 configured to receive a digital signal, wherein the digital signal has a signal bandwidth and comprises a desired signal (compare with 500 of FIG. 5).

The filter arrangement 600 also comprises dividing circuitry (DIV) 602 configured to divide the digital signal into two or more signal parts, wherein the two or more signal parts comprise two edge signal parts and possibly one or more interior signal parts.

As described above, dividing the digital signal into two or more signal parts may typically comprise copying the signal, wherein each copy after frequency shift has a particular part of the signal bandwidth at a position in the frequency domain that corresponds to the channel filter to be applied. This process may be modelled as dividing the signal bandwidth into corresponding two or more constituent bandwidths (compare with 421, 422, 423 of FIG. 4 and 521, 522, 523 of FIG. 5).

The filter arrangement 600 has a respective processing branch associated with each of the two or more signal parts. Each processing branch comprises a digital filter configured to filter the corresponding signal part; a digital edge filter (DEF) 631, 633 for a processing branch configured to process an edge signal part and a digital interior filter (DIF) 632 for a processing branch configured to process an interior signal part.

As mentioned above, the digital interior filters may have fewer filter taps than the digital edge filters. Alternatively, the digital interior filters and the digital edge filters may have the same number of taps.

When the digital interior filter has fewer filter taps than the digital edge filter, the processing branches configured to process interior signal parts may further comprise delay circuitry (DEL) 634 configured to compensate for a time discrepancy between the digital edge filter and the digital interior filter.

Typically, the delay function for the processing paths configured to process interior signal parts is mainly beneficial if there is a need for the samples being time aligned. Alternatively or additionally, a time discrepancy between the digital edge filter and the digital interior filter may be handled by controlling what part of the cyclic prefix is removed. Yet alternatively or additionally, a time discrepancy between the digital edge filter and the digital interior filter may be handled by controlling what sample to input to the FFT.

The processing paths configured to process edge signal parts comprise frequency shifting circuitry (FSC) 611, 613, 651, 653 configured to frequency shift the edge signal part responsive to a determination of whether un-desired signal is comprised in the edge signal part.

Typically, the frequency shifting circuitry 611, 613 is configured to frequency shift the edge signal part before filtering by the digital edge filter by a first amount in a first mode responsive to a determination that the un-desired signal is not comprised in the edge signal part, to provide a first overlap between the frequency shifted edge signal part and the filter frequency range (compare with part (c) of FIG. 5).

Also typically, the frequency shifting circuitry 611, 613 is configured to frequency shift the edge signal part before filtering by a second amount in a second mode responsive to a determination that the un-desired signal is comprised in the edge signal part, to provide a second overlap between the frequency shifted edge signal part and the filter frequency range, wherein the second overlap is less than the first overlap (compare with part (d) of FIG. 5).

Thus, the first mode corresponds to a default mode applied when there is no un-desired signal present in the edge signal part for aligning the edge signal part with the digital edge filter and the first overlap corresponds to a match between the desired signal of the edge signal part and the digital edge filter. Contrarily, the second mode corresponds to a special mode applied when there is an un-desired signal present in the edge signal part and the second overlap corresponds to a slight mismatch between the desired signal of the edge signal part and the digital edge filter. The magnitude of the first amount is typically less than the magnitude of the second amount.

In the second mode, the discrepancy between the first and the second amount is typically compensated for after the digital edge filters. In one approach, the frequency shifting circuitry 651, 653 may be further configured to frequency shift the edge signal part after filtering by the digital edge filter by a third amount. The second amount plus the third amount equals the first amount such that the total effect of the frequency shifting corresponds to shifting by the first amount.

In another approach, the discrepancy between the first and the second amount may be compensated by the frequency shifting circuitry comprising index shifting circuitry configured to (in the second mode) shift FFT bin indices at the output 607 of each processing branch configured to process an edge signal part such that the total effect of the frequency shifting corresponds to shifting by the first amount. This approach is particularly applicable when all processing steps apply sub-carrier quantification and may have the advantage of requiring less hardware. Sub-carrier quantification is generally referred to as sub-carrier spacing (SCS) in the context of 3GPP (Third Generation Partnership Project) standardization. In LTE, a SCS of 15 kHz is applied, which yields substantial granularity for the sub-carrier quantification compared to the carrier bandwidth, which is 1.4 MHz-20 MHz.

One or more (typically all but one) of the processing paths configured to process interior signal parts may also comprise frequency shifting circuitry (not shown) configured to frequency shift the interior signal part. However, such frequency shifting is typically only for aligning the interior signal part with the digital interior filter and not for application of different modes depending on whether an un-desired signal is present or not. Such frequency shifting circuitry is typically applied before the channel filter only (compare with circuitry 311, 312, 315, 316 of FIG. 3).

The processing branches configured to process edge signal parts also comprises determination circuitry (DC) 661, 663 configured to determine whether or not an un-desired signal is comprised in the edge signal part. The determination circuitry is typically configured to control the frequency shifting circuitry to operate in the first or second mode depending of the determination.

For example, the determination circuitry may be configured to detect an input power level and an output power level of the digital edge filter and determine whether the un-desired signal is comprised in the edge signal part responsive to a difference between the input power level and the output power level. This approach is particularly useful when operating in the first (normal) mode to detect presence of an un-desired signal.

In some embodiments, the determination circuitry comprises a peak detector placed after the digital edge filter to detect (in the first operation mode) if there is a residual un-desired signal present which passes the filter. If so, operation may be changed to the second operation mode.

In some embodiments, the determination circuitry comprises a peak detector placed before the digital edge filter to detect (in the second operation mode) if an un-desired signal present earlier had vanished. If so, operation may be changed to the first operation mode.

Alternatively or additionally, another receiver processing tile, e.g. in the case of an AAS receiver, may be used to provide the determination of whether or not there is an un-desired signal present.

For example, the determination circuitry may be configured to detect an output power level of the digital edge filter and determine whether the un-desired signal is comprised in the edge signal part responsive to a difference between the output power level and an output power level of another corresponding digital edge filter of a corresponding processing branch of another filtering arrangement, wherein the filtering arrangement and the other filtering arrangement are operating in different ones of the first and second modes. This approach is particularly useful for operation in the any of the first and second modes to detect presence and/or absence of an un-desired signal.

Thus, one approach to detecting whether an un-desired signal is present or not, may be to use the multiple receivers of an AAS system. For example, when an un-desired signal is present, all receivers but one (or some) are set to operate in the second mode (with lowered cut-off frequency), and the remaining one(s) is set to operate in the first mode and used to detect when the un-desired signal is no longer present.

Figure 7:
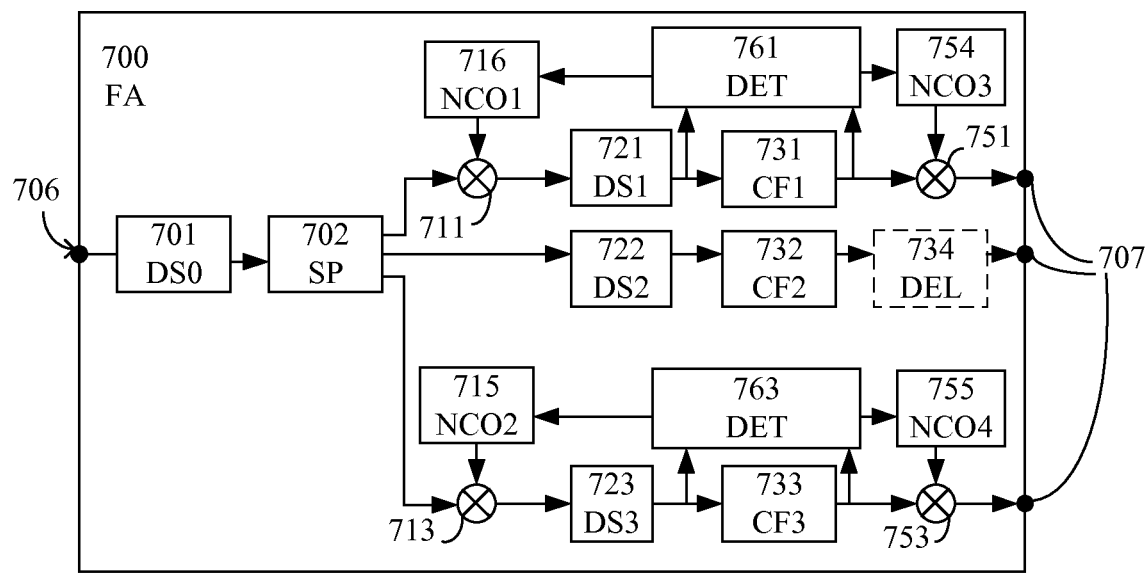
FIG. 7 is a schematic block diagram illustrating an example arrangement according to some embodiments.

FIG. 7 is a schematic block diagram illustrating an example filtering arrangement (FA) 700 according to some embodiments. FIG. 7 illustrates a particular implementation of the arrangement of FIG. 6. The filter arrangement may, for example, be comprised in the filter arrangement 200 of FIG. 2 and/or may, for example, operate in accordance with the approach described in connection with FIG. 5. Typically, the filter arrangement may be for (e.g. may be comprised in) a wireless communication receiver.

The filter arrangement 700 comprises an input port 706 configured to receive a digital signal, wherein the digital signal has a signal bandwidth and comprises a desired signal. The received signal is down-sampled in an initial down-sampler (DS0) 701 and thereafter split into three copies by splitting circuitry (SP) 702, wherein each copy refers to a corresponding signal part in the frequency domain. The splitting circuitry may be seen as an example of the dividing circuitry 602 of FIG. 6.

The filter arrangement 700 has a respective processing branch associated with each of the signal parts. Each processing branch comprises a digital filter configured to filter the corresponding signal part; a digital edge filter (channel filter; CF1, CF3) 731, 733 for a processing branch configured to process an edge signal part and a digital interior filter (channel filter; CF2) 732 for a processing branch configured to process an interior signal part. Each of the processing branches may also comprise a down-sampler (DS1, DS2, DS3) 721, 722, 723 if applicable.

When the digital interior filter has fewer filter taps than the digital edge filter, the processing branches configured to process interior signal parts may further comprise delay circuitry (DEL) 734 configured to compensate for a time discrepancy between the digital edge filter and the digital interior filter.

The processing paths configured to process edge signal parts comprise frequency shifting circuitry configured to frequency shift the edge signal part responsive to a determination of whether un-desired signal is comprised in the edge signal part as explained above in connection with FIG. 6. In the example of FIG. 7, the frequency shifting circuitry is implemented by numerically controlled oscillators (NCO1, NCO2, NCO3, NCO4) 715, 716, 754, 755 and corresponding mixer circuitry 711, 713, 751, 753.

The processing branches configured to process edge signal parts also comprises determination circuitry (DET) 761, 763 configured to determine whether or not an un-desired signal is comprised in the edge signal part as explained above in connection to FIG. 6. The determination circuitry is typically configured to control the numerically controlled oscillators to operate in the first or second mode depending of the determination. The output ports 707 of the filtering arrangement 700 may be operatively connected to respective FFT circuitry.

Figure 8:
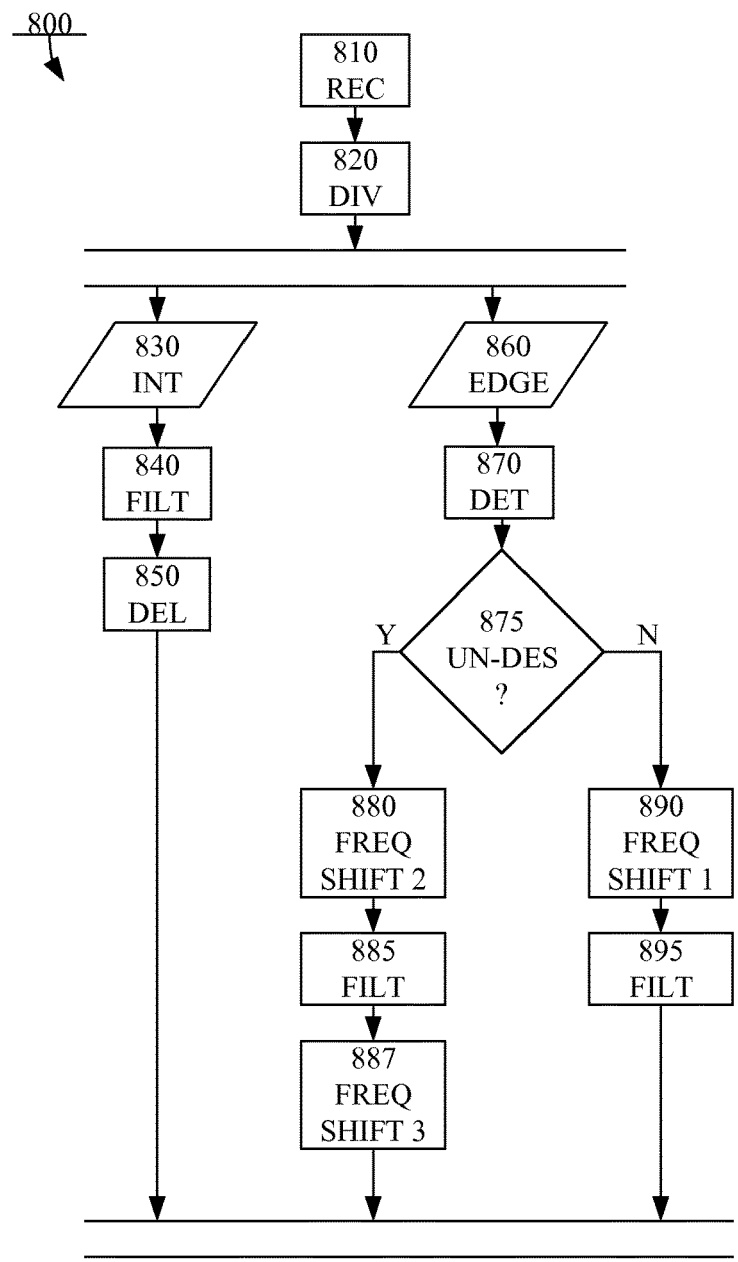
FIG. 8 is a flowchart illustrating example method steps according to some embodiments.

FIG. 8 illustrates an example method 800 according to some embodiments. The method 800 may, for example, be executed by any of the filtering arrangements 200, 600, 700 described in connection with FIGS. 2, 6 and 7. Thus, the method 800 may be for a wireless communication receiver.

In step 810, a digital signal is received (REC), wherein the digital signal has a signal bandwidth and comprises a desired signal (compare with 606 of FIG. 6). The digital signal is divided (DIV) into two or more signal parts in step 820, wherein the two or more signal parts comprise two edge signal parts (compare with 602 of FIG. 6).

For interior (INT) signal parts, the path starting with step 830 is executed, wherein the interior signal part is filtered (FILT) by a digital interior filter in step 840 (compare with 632 of FIG. 6) and—if the digital interior filter has fewer filter taps than the digital edge filter—the time discrepancy between the digital edge filter and the digital interior filter is compensated for by delaying (DEL) the interior signal part in step 850 (compare with 634 of FIG. 6).

For edge (EDGE) signal parts, the path starting with step 860 is executed, wherein it is determined (DET) in step 870 whether an un-desired signal is comprised in the edge signal part (compare with 661, 663 of FIG. 6).

When it is determined that an un-desired signal is not comprised in the edge signal part (N-path out of step 875), a first mode is applied, wherein the edge signal part is frequency shifted (FREQ SHIFT 1) by a first amount in step 890, and filtered (FILT) by a digital edge filter in step 895.

When it is determined that an un-desired signal is comprised in the edge signal part (Y-path out of step 875), a second mode is applied, wherein the edge signal part is frequency shifted (FREQ SHIFT 2) by a second amount in step 880, filtered (FILT) by a digital edge filter in step 885, and frequency shifted (FREQ SHIFT 3) by a third amount in step 887 (wherein the second amount plus the third amount equals the first amount).

In an extension of the embodiments elaborated on so far, one or more of the digital filters may be implemented with a relaxed requirement on in-band ripple (allowing for even less filter taps to be required). The ripple may be (at least partly) compensated for in the frequency domain after the FFT, e.g. by multiplication with an inverse of the ripple pattern and/or by manipulation of the frequency bin selection after FFT.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device or a network node.

Embodiments may appear within an electronic apparatus (such as a wireless communication device or a network node) comprising arrangements, circuitry, and/or logic according to any of the embodiments described herein. Alternatively or additionally, an electronic apparatus (such as a wireless communication device or a network node) may be configured to perform methods according to any of the embodiments described herein.

Figure 9:
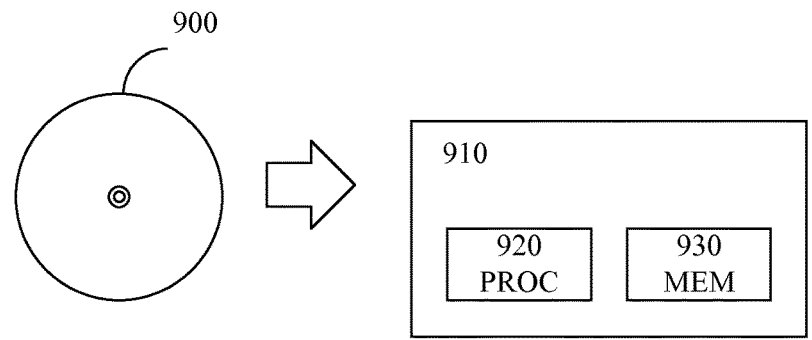
FIG. 9 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 9 illustrates an example computer readable medium in the form of a compact disc (CD) ROM 900. The computer readable medium has stored thereon a computer program comprising program instructions. The computer program is loadable into a data processor (PROC) 920, which may, for example, be comprised in a wireless communication receiver 910, e.g. of a wireless communication device or a network node. When loaded into the data processing unit, the computer program may be stored in a memory (MEM)

930 associated with or comprised in the data-processing unit. According to some embodiments, the computer program may, when loaded into and run by the data processing unit, cause execution of method steps according to, for example, the method illustrated in FIG. 8 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A filtering arrangement for a wireless communication receiver, the filtering arrangement comprising:
   an input port configured to receive a digital signal, wherein the digital signal has a signal bandwidth and comprises a desired signal;
   dividing circuitry configured to divide the digital signal into two or more signal parts, wherein the two or more signal parts comprise two edge signal parts; and
   a respective processing branch associated with each of the two or more signal parts, wherein each processing branch is configured to process a respective edge signal part and comprises:
      a digital edge filter configured to filter the edge signal part;
      determination circuitry configured to determine whether an undesired signal is comprised in the edge signal part; and
      frequency shifting circuitry configured to frequency shift the edge signal part responsive to determination by the determination circuitry.

2. The filtering arrangement of claim 1, wherein the frequency shifting circuitry is configured to frequency shift the edge signal part before filtering by the digital edge filter by:
   a first amount in a first mode responsive to a determination that the undesired signal is not comprised in the edge signal part, to provide a first overlap between the frequency shifted edge signal part and the filter frequency range; and
   a second amount in a second mode responsive to a determination that the undesired signal is comprised in the edge signal part, to provide a second overlap between the frequency shifted edge signal part and the filter frequency range; wherein the second overlap is less than the first overlap.

3. The filtering arrangement of claim 2, wherein the frequency shifting circuitry is further configured to, in the second mode, frequency shift the edge signal part after filtering by the digital edge filter by a third amount; wherein the second amount plus the third amount equals the first amount.

4. The filtering arrangement of claim 2, further comprising:
   a fast Fourier transformer (FFT) configured to transform outputs of the processing branches into frequency domain; and
   index shifting circuitry configured to shift FFT bin indices in the second mode such that, for each of the edge signal parts, the output of the processing branch is frequency shifted by a third amount; wherein the second amount plus the third amount equals the first amount.

5. The filtering arrangement of claim 2, wherein the determination circuitry is configured to:
   detect an input power level and an output power level of the digital edge filter; and
   determine whether the undesired signal is comprised in the edge signal part based on a difference between the input power level and the output power level.

6. The filtering arrangement of claim 2, wherein the determination circuitry is configured to:
   detect an output power level of the digital edge filter; and
   determine whether the undesired signal is comprised in the edge signal part based on a difference between the output power level and an output power level of another corresponding digital edge filter of a corresponding processing branch of another filtering arrangement;
   wherein the filtering arrangement and the other filtering arrangement are operating in different ones of the first and second modes.

7. A wireless communication receiver, comprising:
   a filtering arrangement, the filtering arrangement comprising:
      an input port configured to receive a digital signal, wherein the digital signal has a signal bandwidth and comprises a desired signal;
      dividing circuitry configured to divide the digital signal into two or more signal parts, wherein the two or more signal parts comprise two edge signal parts; and
      a respective processing branch associated with each of the two or more signal parts, wherein each processing branch is configured to process a respective edge signal part and comprises:
         a digital edge filter configured to filter the edge signal part;

determination circuitry configured to determine whether an undesired signal is comprised in the edge signal part; and frequency shifting circuitry configured to frequency shift the edge signal part responsive to determination by the determination circuitry.

8. The wireless communication receiver of claim 7, wherein the frequency shifting circuitry is configured to frequency shift the edge signal part before filtering by the digital edge filter by:
a first amount in a first mode responsive to a determination that the undesired signal is not comprised in the edge signal part, to provide a first overlap between the frequency shifted edge signal part and the filter frequency range; and
a second amount in a second mode responsive to a determination that the undesired signal is comprised in the edge signal part, to provide a second overlap between the frequency shifted edge signal part and the filter frequency range; wherein the second overlap is less than the first overlap.

9. The wireless communication receiver of claim 8, wherein the determination circuitry is configured to:
detect an input power level and an output power level of the digital edge filter; and
determine whether the undesired signal is comprised in the edge signal part based on a difference between the input power level and the output power level.

10. A filtering method for a wireless communication receiver, the method comprising:
receiving a digital signal, wherein the digital signal has a signal bandwidth and comprises a desired signal;
dividing the digital signal into two or more signal parts, wherein the two or more signal parts comprise two edge signal parts; and
processing the two or more signal parts by a respective associated processing branch, wherein the processing comprises, for each of the two edge signal parts:
determining whether an undesired signal is comprised in the edge signal part;
responsive to the determining, frequency shifting the edge signal part; and
filtering the frequency shifted edge signal part by a digital edge filter.

11. The method of claim 10, wherein the frequency shifting the edge signal part before filtering by the digital edge filter comprises frequency shifting the edge signal part by:
a first amount in a first mode, in response to determining that the undesired signal is not comprised in the edge signal part, to provide a first overlap between the frequency shifted edge signal part and the filter frequency range; and
a second amount in a second mode, in response to determining that the undesired signal is comprised in the edge signal part, to provide a second overlap between the frequency shifted edge signal part and the filter frequency range; wherein the second overlap is less than the first overlap.

12. The method of claim 11, wherein frequency shifting the edge signal part further comprises, in the second mode, frequency shifting the edge signal part after filtering by the digital edge filter by a third amount; wherein the second amount plus the third amount equals the first amount.

13. The method of claim 11, further comprising:
transforming outputs of the processing branches into frequency domain via a fast Fourier transformer (FFT); and
shift FFT bin indices in the second mode such that, for each of the edge signal parts, the output of the processing branch is frequency shifted by a third amount; wherein the second amount plus the third amount equals the first amount.

14. The method of claim 11, wherein the determining whether an undesired signal is comprised in the edge signal part comprises:
detecting an input power level and an output power level of the digital edge filter; and
determining whether the undesired signal is comprised in the edge signal part based on a difference between the input power level and the output power level.

15. The method of claim 11, wherein the determining whether an undesired signal is comprised in the edge signal part comprises:
detecting an output power level of the digital edge filter; and
determining whether the undesired signal is comprised in the edge signal part based on a difference between the output power level and an output power level of another corresponding digital edge filter of a corresponding processing branch of another filtering arrangement;
wherein the filtering arrangement and the other filtering arrangement are operating in different ones of the first and second modes.

16. A non-transitory computer readable recording medium storing a computer program product for controlling a wireless communication receiver, the computer program product comprising program instructions which, when run on processing circuitry of the wireless communication receiver, causes the wireless communication receiver to:
receive a digital signal, wherein the digital signal has a signal bandwidth and comprises a desired signal;
divide the digital signal into two or more signal parts, wherein the two or more signal parts comprise two edge signal parts; and
process the two or more signal parts by a respective associated processing branch, wherein the processing comprises, for each of the two edge signal parts:
determining whether an undesired signal is comprised in the edge signal part;
responsive to the determining, frequency shifting the edge signal part; and
filtering the frequency shifted edge signal part by a digital edge filter.

17. The non-transitory computer readable recording medium of claim 16, wherein the instructions are such that the instructions, when run on processing circuitry of the wireless communication receiver, cause the wireless communication receiver to frequency shift the edge signal part before filtering by the digital edge filter by frequency shifting the edge signal part by:
a first amount in a first mode, in response to determining that the undesired signal is not comprised in the edge signal part, to provide a first overlap between the frequency shifted edge signal part and the filter frequency range; and
a second amount in a second mode, in response to determining that the undesired signal is comprised in the edge signal part, to provide a second overlap between the frequency shifted edge signal part and the filter frequency range; wherein the second overlap is less than the first overlap.

18. The non-transitory computer readable recording medium of claim 17, wherein the instructions are such that the instructions, when run on processing circuitry of the wireless communication receiver, cause the wireless communication receiver to:
- transform outputs of the processing branches into frequency domain via a fast Fourier transformer (FFT); and
- shift FFT bin indices in the second mode such that, for each of the edge signal parts, the output of the processing branch is frequency shifted by a third amount; wherein the second amount plus the third amount equals the first amount.

19. The non-transitory computer readable recording medium of claim 17, wherein the instructions are such that the instructions, when run on processing circuitry of the wireless communication receiver, cause the wireless communication receiver to determine whether an undesired signal is comprised in the edge signal part by:
- detecting an input power level and an output power level of the digital edge filter; and
- determining whether the undesired signal is comprised in the edge signal part based on a difference between the input power level and the output power level.

20. The non-transitory computer readable recording medium of claim 17, wherein the instructions are such that the instructions, when run on processing circuitry of the wireless communication receiver, cause the wireless communication receiver to determine whether an undesired signal is comprised in the edge signal part by:
- detecting an output power level of the digital edge filter; and
- determining whether the undesired signal is comprised in the edge signal part based on a difference between the output power level and an output power level of another corresponding digital edge filter of a corresponding processing branch of another filtering arrangement;
- wherein the filtering arrangement and the other filtering arrangement are operating in different ones of the first and second modes.

* * * * *